US007725459B2

(12) United States Patent
Ganduri et al.

(10) Patent No.: US 7,725,459 B2
(45) Date of Patent: May 25, 2010

(54) METHOD AND APPARATUS FOR MANIPULATING DATA WITHIN A REMOTE DATABASE IN A MULTIPLE TIER ENVIRONMENT

(75) Inventors: Shivram Ganduri, San Jose, CA (US); James W. Pickel, Gilroy, CA (US)

(73) Assignee: International Business Machines Corporation, Armonk, NY (US)

( * ) Notice: Subject to any disclaimer, the term of this patent is extended or adjusted under 35 U.S.C. 154(b) by 254 days.

(21) Appl. No.: 11/290,494

(22) Filed: Dec. 1, 2005

(65) Prior Publication Data

US 2007/0130118 A1 Jun. 7, 2007

(51) Int. Cl.
*G06F 17/30* (2006.01)
*G06F 7/00* (2006.01)
(52) U.S. Cl. .............................. 707/718; 707/999.003
(58) Field of Classification Search ............. 707/718
See application file for complete search history.

(56) References Cited

U.S. PATENT DOCUMENTS

| | | | |
|---|---|---|---|
| 5,920,860 | A | 7/1999 | Maheshwari et al. |
| 5,930,786 | A | 7/1999 | Carino, Jr. et al. |
| 6,052,785 | A | 4/2000 | Lin et al. |
| 6,061,689 | A | 5/2000 | Chang et al. |
| 6,105,017 | A | 8/2000 | Kleewein et al. |
| 6,151,602 | A | 11/2000 | Hejlsberg et al. |
| 6,243,718 | B1 | 6/2001 | Klein et al. |
| 6,738,790 | B1 | 5/2004 | Klein et al. |

OTHER PUBLICATIONS

Härder, Theo, et al, "The Intrinsic Problems of Structural Heterogeneity and an Approach to Their Solution", *The VLDB Journal*, 1999 8:25-43, © Springer-Verlag.
Moon, Chanho, and Hyunchul Kang, "Heuristic Algorithms for I/O Scheduling for Efficient Retrieval of Large Objects from Tertiary Storage", *Dept. of Computer Science and Engineering,Chung-Ang University*, IEEE 2001.
Stolte, Etzard, et al, "Scientific Data Repositories—Designing for a Moving Target", SIGMOD 2003, pp. 349-360.

*Primary Examiner*—Isaac M Woo
*Assistant Examiner*—Ann J Chempakaseril
(74) *Attorney, Agent, or Firm*—Elissa Wang; SVL; IP Law

(57) ABSTRACT

An embodiment of the present invention enables manipulation of data on a remote server and ensures uniqueness of data identifiers in a multi-tier environment, where a database client communicates through one or more intermediate servers to reach the target server containing the remote database. In particular, a client system transmits a query to the target server via a gateway system and receives a handle or data reference and a query identification for subsequent manipulation of data residing on that target server. A new query identification is generated by the gateway system and mapped with the query identification of the intended target server. When the client system transmits a query with the gateway query identification, the gateway system performs a lookup operation to identify the corresponding target server and subsequently forwards the query and target server query identification to the identified target server for processing.

20 Claims, 5 Drawing Sheets

METHOD AND APPARATUS FOR MANIPULATING DATA WITHIN A REMOTE DATABASE IN A MULTIPLE TIER ENVIRONMENT

BACKGROUND OF THE INVENTION

1. Technical Field

The present invention embodiments pertain to data manipulation within a remote database. In particular, embodiments of the present invention pertain to a system and method enabling database clients to manipulate data within a remote database in a multi-tier environment (e.g., the remote database generally resides on a target server that is accessed through intermediate servers) without actually retrieving that data.

2. Discussion of Related Art

Remote databases may store data in various data types, where certain data types (e.g., Large Object Data (LOB), XML data, etc.) are typically utilized to store large data objects. In order to prevent large data objects (or instances of data types forming those large data objects) from being transmitted across a network, locators or handles (e.g., SQL locators, pointers, etc.) identifying the desired data objects (or instances of the data types) are employed and transferred across the network to indicate the desired data. When a database client desires to manipulate data objects within a remote database without retrieving the data, the database client employs the handles to identify data for desired operations. The remote database generally resides on a target server.

Since the handles consume significantly less storage capacity than the data objects, network bandwidth is conserved while reducing network traffic. However, the handles are limited to working in a two-tier client-server configuration (e.g., the remote database residing on a server accessible without intermediate servers) since these handles or locators are not unique across multiple database servers.

SUMMARY OF THE INVENTION

Accordingly, embodiments of the present invention include a system for remotely performing operations on a data object stored in a remote storage unit, wherein the data object is associated with a data identifier identifying the data object to enable a user to remotely manipulate the data object without retrieving the data object from the remote storage unit. The system includes a processing system to process queries from a user for the data object and forward the user queries to an intended one of a plurality of remote storage units storing the data object to perform operations indicated by the user queries on the data object. The processing system includes one or more modules: to generate a destination identification identifying the intended storage unit; to store information relating to the intended storage unit based on the destination identification, wherein transmission of the destination identification and the data identifier to the user is facilitated in response to a first query from the user; to receive a second query from the user including the destination identification; and to determine the intended storage unit based on the destination identification to facilitate transmission of the second user query to the intended storage unit. The embodiments further include a method and a program product apparatus for remotely manipulating data as described above.

The embodiments of the present invention overcome the above-mentioned problems by mapping a new query identification generated by a gateway system with the query identification of an intended target server with the desired data. Thus, when a client system transmits a query with the gateway query identification, the gateway system performs a lookup operation to identify the corresponding target server name and query identification. The gateway system subsequently forwards the query and target server query identification to the identified target server for processing. Since the query is processed at the intended target server for the appropriate instance of the query using a unique data handle, the correct intended data is returned to the client system.

The above and still further features and advantages of the present invention embodiments will become apparent upon consideration of the following detailed description of those embodiments, particularly when taken in conjunction with the accompanying drawings wherein like reference numerals in the various figures are utilized to designate like components.

DETAILED DESCRIPTION OF THE PREFERRED EMBODIMENTS

The present invention embodiments enable manipulation of data on a remote server and ensure uniqueness of data identifiers (e.g., handles or locators) in a multi-tier environment (e.g., a database client communicates through one or more intermediate servers to reach a target server containing the remote database). The data is preferably in the form of large data objects (e.g., instances of data types, such as Large Object Data (LOB), XML data, etc.), where the remote server utilizes locators or handles (e.g., pointers, etc.) to identify the data objects, thereby enabling users to manipulate the data without retrieval and transmission of the data from the database.

Figure 1:
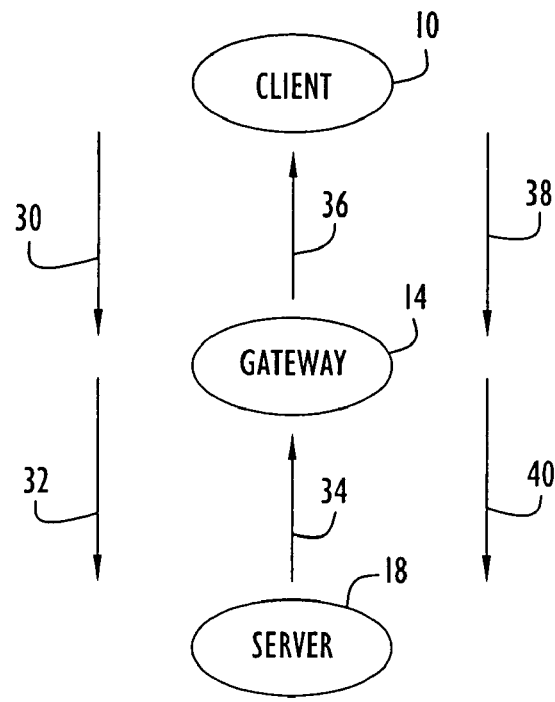
FIG. 1 is a flow diagram illustrating the manner in which an exemplary system remotely manipulates data on a target server.

An exemplary system accommodating handles is illustrated in FIG. 1. Specifically, a multiple tier environment includes a client system 10, a gateway system 14 and target server 18. The client system, gateway system and target server may be in communication via networks (not shown). Client system 10 initially transmits a query including the intended target server name to gateway system 14 to retrieve data references or handles from that target server at flow 30. Gateway system 14 receives and parses the query to determine the intended target server name and subsequently forwards the query to intended target server 18 at flow 32. Target Server 18 retrieves and returns the requested data references or handles and a unique query identification to gateway system 14 at flow 34. Gateway system 14 transmits the query identification and data references or handles to requesting client system 10 at flow 36.

The client system generates a new statement or query that uses the data references from the initial query and transmits the statement to gateway system 14 at flow 38. In order to process the statement, the statement needs to be forwarded to the target server that generated the data references. In the case of a single target server (e.g., target server 18) or unique query identification, the gateway system forwards the statement to the proper target server that generated the data references at flow 40. This target server may be designated as a default target server within the gateway system, or the gateway system may be designated as the target server and process the query.

Figure 2:
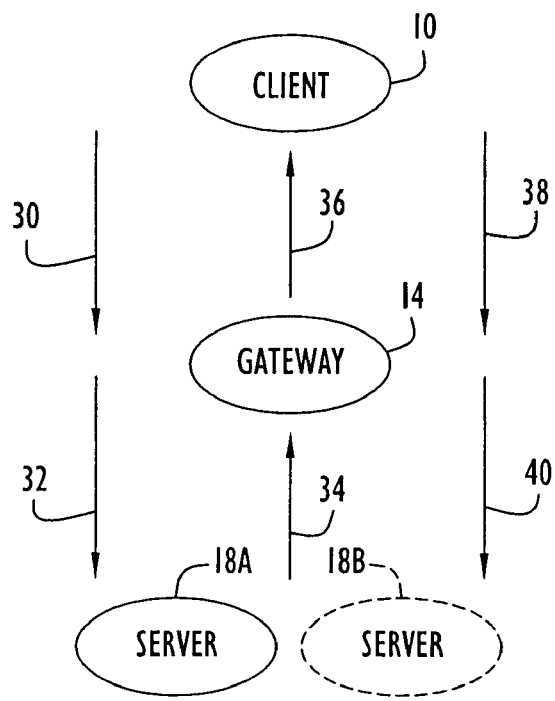
FIG. 2 is a flow diagram illustrating the manner in which an exemplary system remotely manipulates data in the presence of duplicate data identifiers across plural target servers.

However, query identifications may not be unique across target servers as illustrated in FIG. 2. Initially, the multiple tier environment is substantially similar to the environment described above for FIG. 1, and includes target servers 18a, 18b that collectively employ duplicate query identifications (e.g., one or more query identifications unique to each target server may be simultaneously employed by target servers 18a and 18b). In this case, the client system may send the initial query to target server 18a and receive data references and a query identification from that target server at flows 30, 32, 34 and 36 in substantially the same manner described above.

A subsequent query with the data references and query identification is sent to gateway system 14 from client system 10 at flow 38. Since the query identification is not unique across target servers 18a, 18b, the gateway system may become confused and send the query to a designated default target server 18b instead of intended target server 18a. Thus, the gateway system forwards the statement to incorrect server 18b at flow 40, or may attempt to process the query in the event the gateway system is designated as the default server. This action may cause an error message to be returned, or initiate data integrity problems when the incorrect server coincidentally includes an identical data reference value or handle. For example, the client system may receive data identified by a handle identical to the requested handle from an incorrect server, but be unaware that the received data does not correspond to the desired data.

Figure 3:
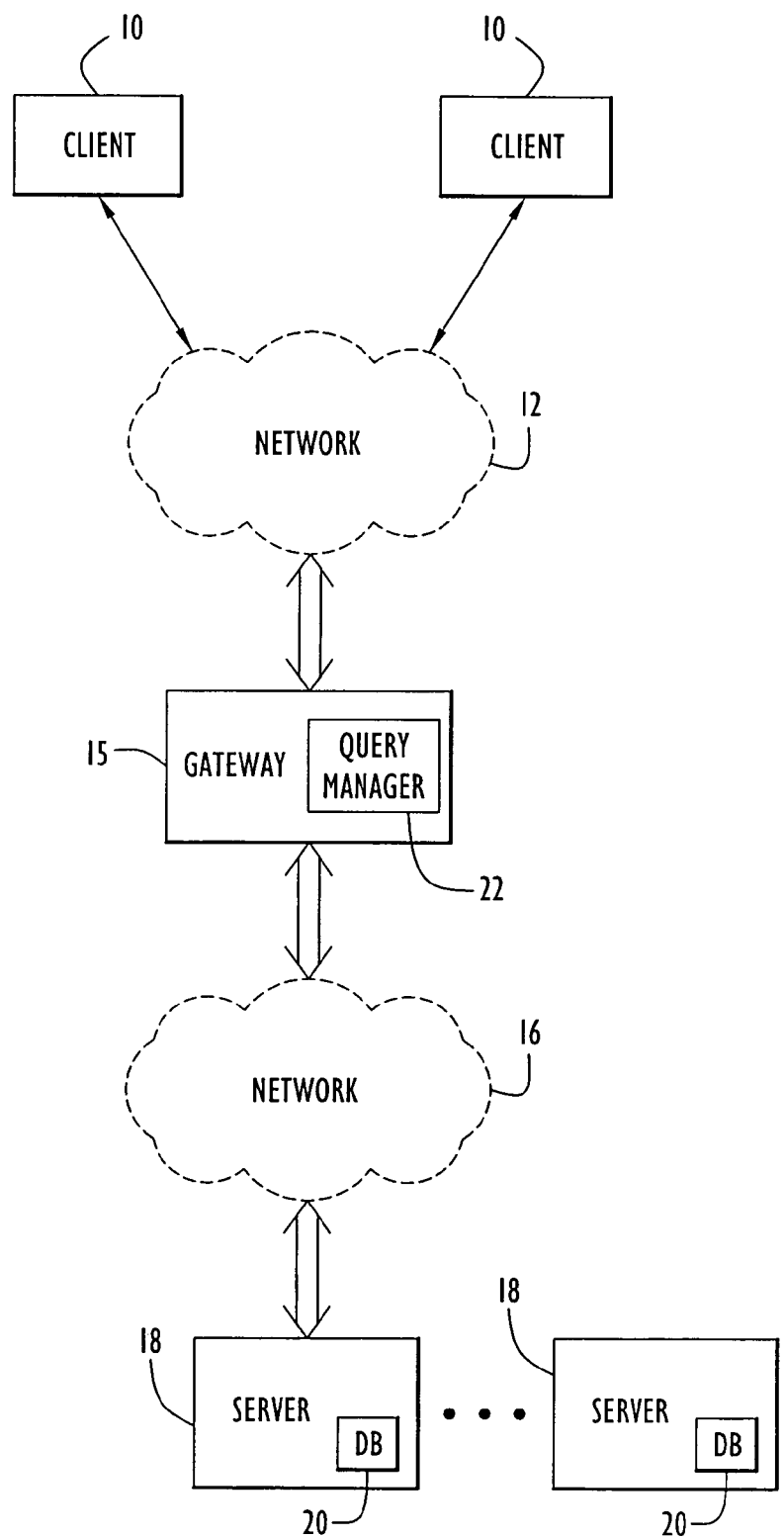
FIG. 3 is a diagrammatic illustration of the overall system topology for remote manipulation of data within a remote database according to an embodiment of the present invention.

An exemplary system employing data manipulation according to an embodiment of the present invention is illustrated in FIG. 3. Specifically, the system includes one or more client systems 10, a gateway system 15 and one or more target servers 18. The client systems, gateway system and target servers may be implemented by any conventional or other computer systems preferably equipped with a display or monitor, a base (e.g., including the processor, memories and/or internal or external communications devices (e.g., modem, network cards, etc.)) and optional input devices (e.g., a keyboard, mouse or other input device).

Client systems 10 are coupled to gateway system 15, preferably via a communication network 12. Gateway system 15 is further coupled to target servers 18, preferably via a communication network 16. The gateway system includes a query manager module or unit 22 to ensure delivery of client requests to the appropriate target server as described below. This component may be implemented by any combination of software and/or hardware modules or units. The target servers each include a database 20 storing data objects and other information for manipulation by a client system. Networks 12, 16 may be implemented by any quantity of any suitable communications media (e.g., WAN, LAN, Internet, Intranet, etc.). The gateway system serves as an interface between networks 12, 16 and may be implemented by any conventional or other computer or processing systems or devices (e.g., personal computers, servers, etc.). The client systems may be local to or remote from the gateway system, while the gateway system may be local to or remote from the target servers.

The gateway system, under software control, basically implements the remote data manipulation of an embodiment of the present invention. The software for the present invention embodiments (e.g., query manager module, etc.) may be available on a recordable medium (e.g., magnetic, optical, floppy, DVD, CD, etc.) or in the form of a carrier wave or signal for downloading from a source via a communication medium (e.g., bulletin board, network, WAN, LAN, Intranet, Internet, etc.).

Figure 4:
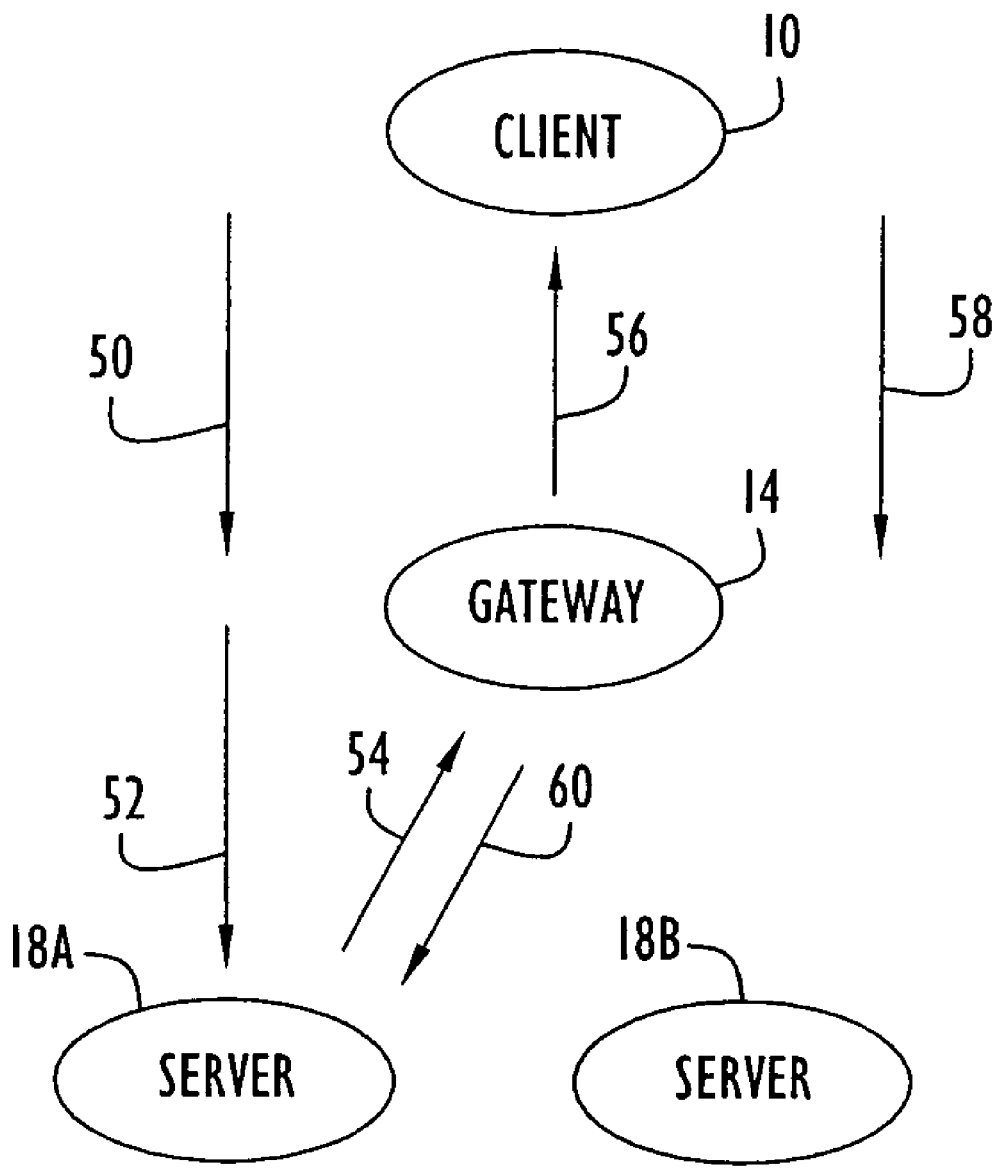
FIG. 4 is a flow diagram illustrating the manner in which data objects are remotely manipulated according to an embodiment of the present invention.

An embodiment of the present invention ensures proper delivery of a user generated database statement or query to the appropriate target server as illustrated in FIG. 4. Specifically, an exemplary topology includes client system 10, gateway system 15 and target servers 18a, 18b, each as described above. The client system, gateway system and target servers may be in communication via networks (not shown) as described above. Client system 10 initially transmits a query including the intended target server name to gateway system 15 to retrieve data references or handles from that target server at flow 50. This initial query may be any conventional query or database operation.

Query manager module 22 (FIG. 3) of gateway system 15 receives and parses the query for forwarding to intended target server 18a at flow 52 as described below. Target Server 18a retrieves and returns the requested data references and a unique query identification to gateway system 15 at flow 54. The query manager module generates a new gateway query identification and saves the target server query identification and other information (e.g., target server name, address, etc.) to map the gateway query identification with the target server as described below. The gateway system subsequently transmits the gateway query identification and data references to requesting client system 10 at flow 56.

Once the client system receives the gateway query identification and data references at flow 56, the client system may generate a new statement or query that uses the data references from the initial query. The new query is transmitted to gateway system 15 at flow 58. The gateway system utilizes the gateway query identification to identify the target server name and the corresponding target server query identification as described below. The gateway system forwards the statement, target server identification and data references to intended target server 18a at flow 60. Target server 18a performs a lookup operation on the target server query identification to determine the intended target server. If target server 18a is the intended target server, the query is processed locally using the data reference. The target server provides the requested data to the gateway system for transference to the requesting client system. Since the query is processed at the intended target server for the proper instance of the query using a unique data reference value, the correct intended data is returned to client system 10.

Figure 5:
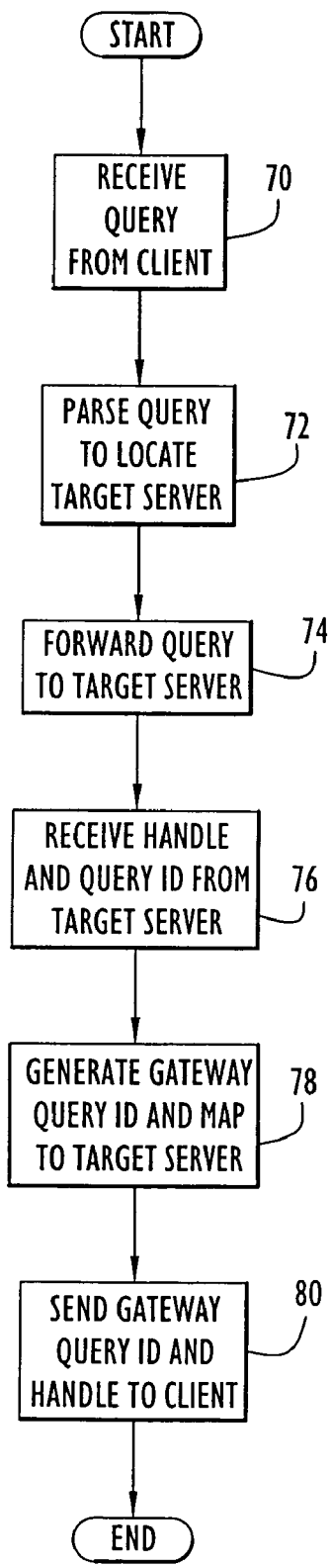
FIG. 5 is a procedural flow chart illustrating the manner in which the gateway system maps a query identification to a target server according to an embodiment of the present invention.

The manner in which query manager module 22 (FIG. 3) processes query information according to an embodiment of the present invention is illustrated in FIG. 5. Initially, the query manager module receives a query from a client system at step 70 as described above and parses the query to determine the intended target server name at step 72. The query is subsequently forwarded to the intended target server at step 74. The target server retrieves and returns requested data references or handles and a unique query identification to the gateway system as described above. The query manager module receives the data references and query identification at step 76 and creates a new gateway query identification at step 78. The query manager module further stores the target server query identification and other information (e.g., target server name, address, etc.) at step 78 and associates this data with the generated gateway query identification. This provides a mapping of the gateway query identification to the appropriate target server containing the requested data. The gateway system transmits the gateway query identification and data references to the requesting client system at step 80 as described above.

Figure 6:
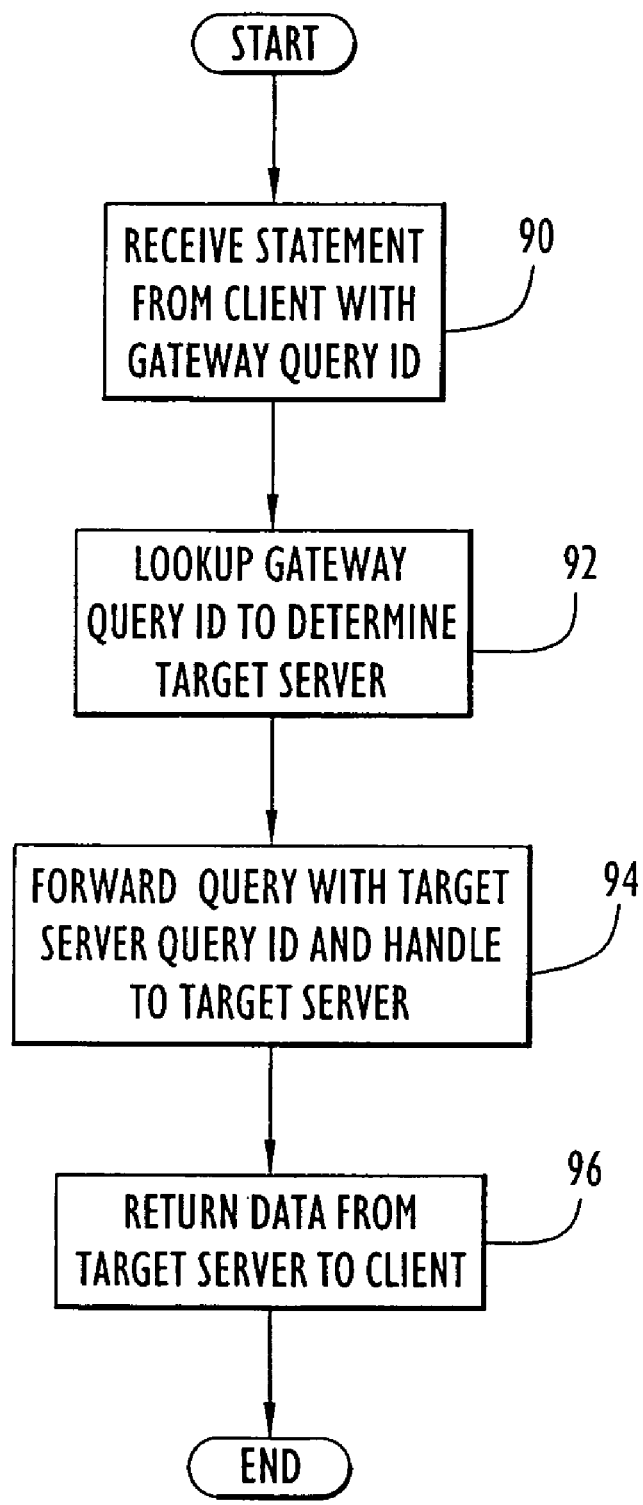
FIG. 6 is a procedural flow chart illustrating the manner in which the gateway system forwards a query to a target server according to an embodiment of the present invention.

The manner in which query manager module 22 (FIG. 3) determines the appropriate target server to receive a user query in accordance with an embodiment of the present invention is illustrated in FIG. 6. Initially, once a client system receives the gateway query identification and data references from the gateway system, the client system may generate a new statement or query that uses the data references from the initial query as described above. The new query is transmitted to gateway system 15. Query manager module 22 receives the query from the client system at step 90 and performs a lookup operation on the gateway query identification within the statement to identify the target server name and the corresponding target server query identification at step 92. The gateway system forwards the statement, target server identification and data reference to the identified target server at step 94. The target server processes the query and provides the requested data to the gateway system as described above. The gateway system returns the requested data to the client system at step 96.

The processes described above for FIGS. 5-6 are typically performed in response to the user query containing operations for data types employing handles or locators. Queries for other data items are preferably processed by the client, gateway and target server systems in a conventional manner.

It will be appreciated that the embodiments described above and illustrated in the drawings represent only a few of the many ways of implementing a method and apparatus for manipulating data within a remote database in a multiple tier environment.

The environment of the present invention embodiments may include any quantity of tiers, client systems, gateway systems and target servers. The client, gateway and target server systems employed by the present invention embodiments may be implemented by any quantity of any personal or other type of computer system (e.g., IBM-compatible, Apple, Macintosh, laptop, palm pilot, etc.), and may include any commercially available operating system (e.g., Windows, OS/2, Unix, Linux, etc.) and any commercially available or custom software (e.g., browser software, communications software, server software, query manager software of the present invention embodiments, etc.). These systems may include any types of monitors and input devices (e.g., keyboard, mouse, voice recognition, etc.) to enter and/or view information.

The databases may be implemented by any quantity of any type of conventional or other databases (e.g., relational, hierarchical, etc.) or storage structures (e.g., files, data structures, disk or other storage, etc.). The databases may store any desired information arranged in any fashion (e.g., tables, relations, hierarchy, etc.).

It is to be understood that the software (e.g., query manager module, etc.) for the computer systems of the present invention embodiments (e.g., client systems, gateway system, target servers, etc.) may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry. The various functions of the computer systems may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the client systems, gateway system and target servers. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments may be available on a recordable medium (e.g., magnetic or optical mediums, magneto-optic mediums, floppy diskettes, CD-ROM, DVD, memory devices, etc.) for use on standalone systems or systems connected by a network or other communications medium, and/or may be downloaded (e.g., in the form of carrier waves, packets, etc.) to systems via a network or other communications medium.

The communication networks may be implemented by any quantity of any type of communications network (e.g., LAN, WAN, Internet, Intranet, VPN, etc.). The computer systems of the present invention embodiments (e.g., client systems, gateway system, target servers, etc.) may include any conventional or other communications devices to communicate over the networks via any conventional or other protocols. The computer systems (e.g., client systems, gateway system, target servers, etc.) may utilize any type of connection (e.g., wired, wireless, etc.) for access to the network.

The queries may be of any quantity or type and request any type of database or other operation. The queries may include any desired format and may be directed toward any conventional or other database or storage unit. The handles or locators may be of any quantity or type and include any format (e.g., symbols, numeric, alphanumeric, etc.) to identify a data object. The data objects may be of any type, size or quantity, may store any information (e.g., documents, images, audio, video, etc.) and may be associated with any quantity of locators or other identifiers.

The gateway query identification may be generated in any fashion based on any characteristics (e.g., random number, sequential or other identifier indicating the query order, based on the target server or desired data, etc.). The gateway query identification may include any quantity of any desired characters or symbols (e.g., numeric, alphanumeric, etc.). The gateway query identification may have portions thereof associated with corresponding attributes (e.g., the first portion may indicate a server or address, an intermediate portion may indicate a database, etc.). The gateway system may store any desired information to identify a target server (e.g., target server name, address, etc.) and may associate the information with a gateway query identification in any fashion (e.g., hash function, relation, indices, etc.). The mapping may be stored in any type of storage or data structure (e.g., array, table, database, etc.). The lookup operation may be performed based on any information associated with the gateway query identification (e.g., the entire identification or any portion thereof, etc.).

The present invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

It is to be understood that the present invention embodiments are not limited to the applications disclosed herein, but may be utilized for any suitable data types or data objects employing locators or pointers to remotely or locally manipulate the data in an environment with any quantity of tiers. Further, the query management module may reside on any processing device (e.g., client system, target server, gateway system, router, any intermediate processing systems between client systems and target servers, etc.) to associate target servers with client requests.

From the foregoing description, it will be appreciated that the invention makes available a novel method and apparatus for manipulating data within a remote database in a multiple tier environment, wherein a system and method enable database clients in a multi-tier environment (e.g., the remote database generally resides on a target server that is accessed through intermediate servers) to manipulate data within a remote database without actually retrieving that data.

Having described preferred embodiments of a new and improved method and apparatus for manipulating data within a remote database in a multiple tier environment, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A method of determining a remote target system storing a desired data object from among a plurality of remote target systems to remotely perform operations on that data object, wherein data objects stored on said remote target systems are each associated with a data identifier used for identifying and accessing said data object on said remote target system to enable a user to remotely manipulate said data object without retrieving said data object from said remote target system, said method comprising:

forwarding a first query from a processing system to an intended one of said plurality of remote target systems storing desired data;

receiving at said processing system from said intended target system a query identification for said first query and said data identifier for a data object stored on said intended target system in response to said first query, wherein each remote target system includes a storage unit to store data, wherein said query identification for said first query identifies said intended target system storing said desired data, and wherein said query identification for said first query is simultaneously employed by at least two different remote target systems, thereby associating said first query with at least one other remote target system without said desired data;

generating a target destination identification at said processing system and storing target system information based on said target destination identification, wherein said target system information includes said query identification received from said intended target system and information identifying said intended target system storing said desired data, and wherein said target destination identification is used to retrieve said stored information, thereby providing a mapping between said target destination identification and said intended target system storing said desired data;

transmitting query information including said target destination identification from said processing system to said user in response to said first query;

receiving a second query at said processing system from said user including said target destination identification, utilizing said target destination identification received with said second query to retrieve said target system information, and determining, based on said retrieved target system information, said intended target system to receive said second query from among the plurality of remote target systems; and transmitting said second query from said processing system to said intended target system determined to receive said second query.

2. The method of claim 1 further including:
generating said first and second queries via at least one client system coupled to said processing system.

3. The method of claim 2, wherein said remote target systems and said at least one client system are coupled to said processing system via at least one network.

4. The method of claim 1, wherein said storage unit of each remote target system includes a database.

5. The method of claim 1, wherein said data identifier includes a pointer indicating a location of said data object to enable said user to remotely manipulate said data object without retrieving said data object from said intended target system.

6. The method of claim 3, wherein said processing system includes a gateway system.

7. The method of claim 1, wherein said forwarding said first query includes:
   examining said first query from said user for said desired data and determining said intended target system for said first query to transmit said first query to said intended target system.

8. A system for determining a remote target system storing a desired data object from among a plurality of remote target systems to remotely perform operations on that data object, wherein data objects stored on said remote target systems are each associated with a data identifier used for identifying and accessing said data object on said remote target system to enable a user to remotely manipulate said data object without retrieving said data object from said remote target system, said system comprising:
   a processing system coupled to a plurality of remote target systems to process queries from a user for said data object and forward said user queries to an intended one of said plurality of remote target systems storing said data object to perform operations indicated by said user queries on said data object, said processing system including:
      a query forward module to forward a first query to an intended one of said plurality of remote target systems storing desired data;
      a query receipt module to receive from said intended target system a query identification for said first query and said data identifier for a data object stored on said intended target system in response to said first query, wherein each remote target system includes a storage unit for storing data, wherein said query identification for said first query identifies said intended target system storing said desired data, and wherein said query identification for said first query is simultaneously employed by at least two different remote target systems, thereby associating said first query with at least one other remote target system without said desired data;
      a map module to generate a target destination identification, to store target system information based on said target destination identification, wherein said target system information includes said query identification received from said intended target system and information identifying said intended target system storing said desired data, and wherein said target destination identification is used to retrieve said stored information, thereby providing a mapping between said target destination identification and said intended target system storing said desired data, and to facilitate transmission of query information including said target destination identification to said user in response to said first query; and
      a forward module to receive a second query from said user including said target destination identification, to utilize said target destination identification received with said second query to retrieve said target system information, to determine, based on said retrieved target system information, said intended target system among said second query from among the plurality of remote target systems, and to facilitate transmission of said second query to said intended target system determined to receive said second query.

9. The system of claim 8 further including:
   at least one client system coupled to said processing system to generate said first and second queries.

10. The system of claim 9, wherein said remote target systems and said at least one client system are coupled to said processing system via at least one network.

11. The system of claim 8, wherein each remote target system includes a target server with a corresponding database.

12. The system of claim 8, wherein said data identifier includes a pointer indicating a location of said data object to enable said user to remotely manipulate said data object without retrieving said data object from said intended target system.

13. The system of claim 10, wherein said processing system includes a gateway system.

14. The system of claim 8, wherein said query forward module further includes:
   a query examination module to examine said first query from said user for said desired data and determine said intended target system for said first query to facilitate transmission of said first query to said intended target system.

15. A program product apparatus including a memory with computer program logic stored therein that, when executed by a computer, determines a remote target system storing a desired data object from among a plurality of remote target systems to performs remote operations on that data object, wherein data objects stored on said remote target systems are each associated with a data identifier used for identifying and accessing said data object on said remote target system to enable a user to remotely manipulate said data object without retrieving said data object from said remote target system, said program product apparatus comprising:
   a query forward module to forward a first query to an intended one of said plurality of remote target systems storing desired data;
   a query receipt module to receive from said intended target system a query identification for said first query and said data identifier for a data object stored on said intended target systems in response to said first query, wherein each remote target system includes a storage unit for storing data, wherein said query identification for said first query identifies said intended target system storing said desired data, and wherein said query identification for said first query is simultaneously employed by at least two different remote target systems, thereby associating said first query with at least one other remote target system without said desired data;
   a map module to generate a target destination identification, to store target system information based on said target destination identification, wherein said target system information includes said query identification received from said intended target system and information identifying said intended target system storing said desired data, and wherein said target destination identification is used to retrieve said stored information, thereby providing a mapping between said target destination identification and said intended target system storing said desired data, and to facilitate transmission of query information including said target destination identification to said user in response to said first query; and
   a forward module to receive a second query from said user including said target destination identification, to utilize said target destination identification received with said second query to retrieve said target system information, to determine, based on said retrieved target system information, said intended target system to receive said second query from among the plurality of remote target systems, and to facilitate transmission of said second query to said intended target system determined to receive said second query.

16. The program product apparatus of claim 15, wherein each remote target system includes a target server with a corresponding database.

17. The program product apparatus of claim 15, wherein said query forward module includes:

a query examination module to examine said first query from said user for said desired data and determine said intended target system for said first query to facilitate transmission of said first query to said intended target system.

18. The method of claim 1, wherein said data identifier for said data object is simultaneously employed by at least two different remote target systems.

19. The system of claim 8, wherein said data identifier for said data object is simultaneously employed by at least two different remote target systems.

20. The program product apparatus of claim 15, wherein said data identifier for said data object is simultaneously employed by at least two different remote target systems.

* * * * *